（12）United States Patent
Lakhi et al.

(10) Patent No.: US 12,025,698 B2
(45) Date of Patent: Jul. 2, 2024

(54) ENHANCED HUMAN MACHINE INTERFACE FOR STORM GROWTH RATE

(71) Applicant: Rockwell Collins, Inc., Cedar Rapids, IA (US)

(72) Inventors: Divesh Lakhi, Cedar Rapids, IA (US); Ross Lintelman, West Melbourne, FL (US); Vasanthakumar Kungarupalayam Sellamuthu, West Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 622 days.

(21) Appl. No.: 17/215,616

(22) Filed: Mar. 29, 2021

(65) Prior Publication Data

US 2022/0308208 A1    Sep. 29, 2022

(51) Int. Cl.
*G01S 13/95*    (2006.01)
*G06N 5/02*    (2023.01)

(52) U.S. Cl.
CPC ............... *G01S 13/95* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 1,746,989 A | 2/1930 | William | |
| 6,549,161 B1 | 4/2003 | Woodell | |
| 6,828,922 B1 | 12/2004 | Gremmert et al. | |
| 6,879,280 B1 | 4/2005 | Bull et al. | |
| 7,109,912 B1 * | 9/2006 | Paramore | G01S 13/953 342/182 |
| 7,109,913 B1 | 9/2006 | Paramore et al. | |
| 7,486,220 B1 * | 2/2009 | Kronfeld | G01W 1/10 342/26 B |
| 7,558,674 B1 * | 7/2009 | Neilley | G01W 1/10 702/3 |
| 7,656,343 B1 | 2/2010 | Hagen et al. | |
| 7,982,658 B2 | 7/2011 | Kauffman et al. | |
| 8,085,182 B2 | 12/2011 | Kauffman | |

(Continued)

FOREIGN PATENT DOCUMENTS

TW    I710805 B    11/2020
WO    2013062932 A1    5/2013

OTHER PUBLICATIONS

Extended Search Report in European Application No. 22156747.2 dated Jul. 7, 2022, 8 pages.

*Primary Examiner* — Bernarr E Gregory
(74) *Attorney, Agent, or Firm* — Suiter Swantz IP

(57) ABSTRACT

An avionics computer system receives or calculates storm growth rate data, converts that data into a renderable format, and displays that data visually. The avionics computer system receives location and trajectory data, projects a future storm size/height based on the trajectory and growth rate, and determines if the storm is likely to intersect the trajectory when the aircraft is projected to reach the storm location. Certain threshold growth rates are associated with some artifice indicating the severity of the storm. The application of such artifice may be weighted according to the aircraft trajectory, estimated growth rate, and a projected proximity to the storm.

18 Claims, 5 Drawing Sheets

(56) References Cited

U.S. PATENT DOCUMENTS

| | | | |
|---|---|---|---|
| 8,159,369 B1* | 4/2012 | Koenigs | G01S 13/953 340/963 |
| 9,411,044 B1 | 8/2016 | Sperling et al. | |
| 9,558,670 B1 | 1/2017 | Sheth et al. | |
| 9,613,269 B2 | 4/2017 | Kilty et al. | |
| 9,933,548 B1* | 4/2018 | Stenneth | G01W 1/10 |
| 10,684,366 B1 | 6/2020 | Kronfeld et al. | |
| 2010/0019938 A1 | 1/2010 | Bunch | |
| 2018/0275396 A1 | 9/2018 | Schowengerdt et al. | |
| 2018/0313975 A1 | 11/2018 | Chen | |
| 2020/0175628 A1* | 6/2020 | Srinivasan | G06Q 50/265 |

* cited by examiner

ENHANCED HUMAN MACHINE INTERFACE FOR STORM GROWTH RATE

BACKGROUND

Storm growth rates are a significant indicator of danger. Growing storms are dangerous to the aircraft and should be avoided. Existing weather monitoring systems have no mechanism to deliver growth rate information to pilots. The only option available is for the pilot to monitor storm data and extrapolate.

It would be advantageous to have a system capable of displaying storm growth rate information in a form instantly comprehensible and useable for the pilot.

SUMMARY

In one aspect, embodiments of the inventive concepts disclosed herein are directed to an avionics computer system that receives or calculates storm growth rate data, converts that data into a renderable format, and displays that data visually.

In a further aspect, the avionics computer system receives location and trajectory data, projects a future storm size/height based on the trajectory and growth rate, and determines if the storm is likely to intersect the trajectory when the aircraft is projected to reach the storm location.

In a further aspect, certain threshold growth rates are associated with some artifice indicating the severity of the storm. The application of such artifice may be weighted according to the aircraft trajectory, estimated growth rate, and a projected proximity to the storm.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
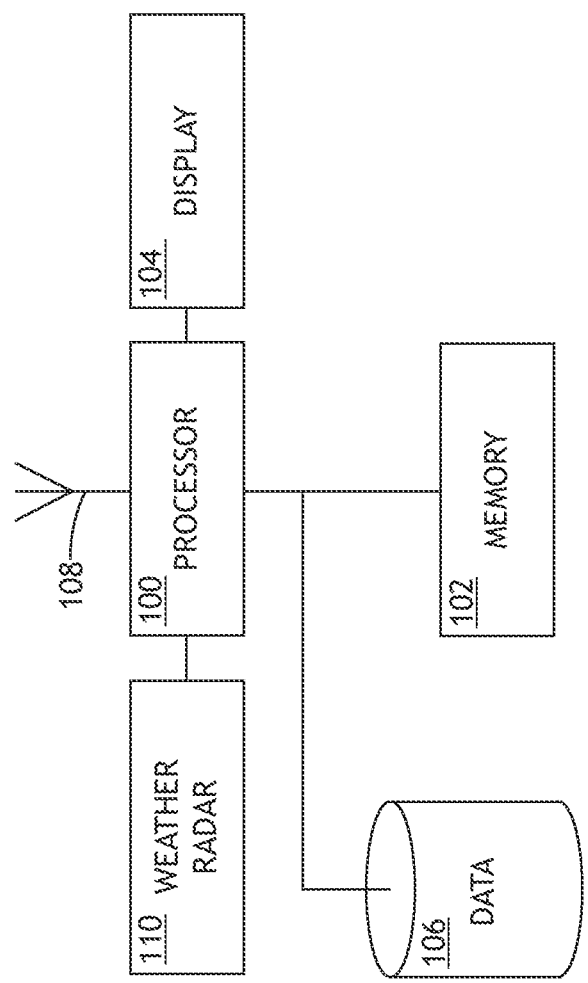
FIG. 1 shows a block diagram of a system suitable for implementing an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an avionics computer system that receives or calculates storm growth rate data, converts that data into a renderable format, and displays that data visually. The avionics computer system receives location and trajectory data, projects a future storm size/height based on the trajectory and growth rate, and determines if the storm is likely to intersect the trajectory when the aircraft is projected to reach the storm location. Certain threshold growth rates are associated with some artifice indicating the severity of the storm. The application of such artifice may be weighted according to the aircraft trajectory, estimated growth rate, and a projected proximity to the storm.

Referring to FIG. 1, a block diagram of a system suitable for implementing an exemplary embodiment is shown. The system includes a processor 100, a memory 102 connected to the processor 100 for embodying processor executable code, and a display 104 configured to display weather related data. The processor 100 receives storm data either via a datalink 108 or directly via a weather radar 110 connected to the processor 100, and receives or computes a storm growth rate. In at least one embodiment, the processor 100 receives a growth rate corresponding to each storm from the weather radar 110; alternatively, the processor 100 may iteratively receive storm size data and compute a growth rate based on changes in storm size over time.

The processor 100 then determines a severity of each storm based on the corresponding growth rate. In at least one embodiment, the severity is based on a predetermined growth rate threshold; alternatively, or in addition, the severity may be based on an algorithm utilizing data from a data storage device 106 to determine a severity based on the growth rate and proximity of the aircraft to the storm.

In at least one embodiment, the processor 100 may determine a future proximity of the storm to the aircraft if the aircraft proceeds along a current flight path at a current airspeed. The current severity is then also based on the size of the storm at that future time based on the growth rate and the projected proximity.

The processor 100 renders an artifice indicating the severity of the storm. The artifice may comprise a color-coded indicator corresponding to certain threshold severities. In at least one embodiment, the artifice may indicate positive or negative growth rates (growing or shrinking). Furthermore, the artifice may comprise a ring corresponding to the growth rate. Alternatively, or in addition, the artifice may include a projected size based on the growth rate at some future time, either predetermined or based on the aircraft airspeed.

In at least one embodiment, the processor 100 may render an elevation view as well as an overhead or perspective view. A rendered elevation view may include an artifice indicating the severity in terms of changing height. In at least one embodiment, the artifice may include a projected height based on the growth rate at some future time, either predetermined or based on the aircraft airspeed.

Figure 2A:
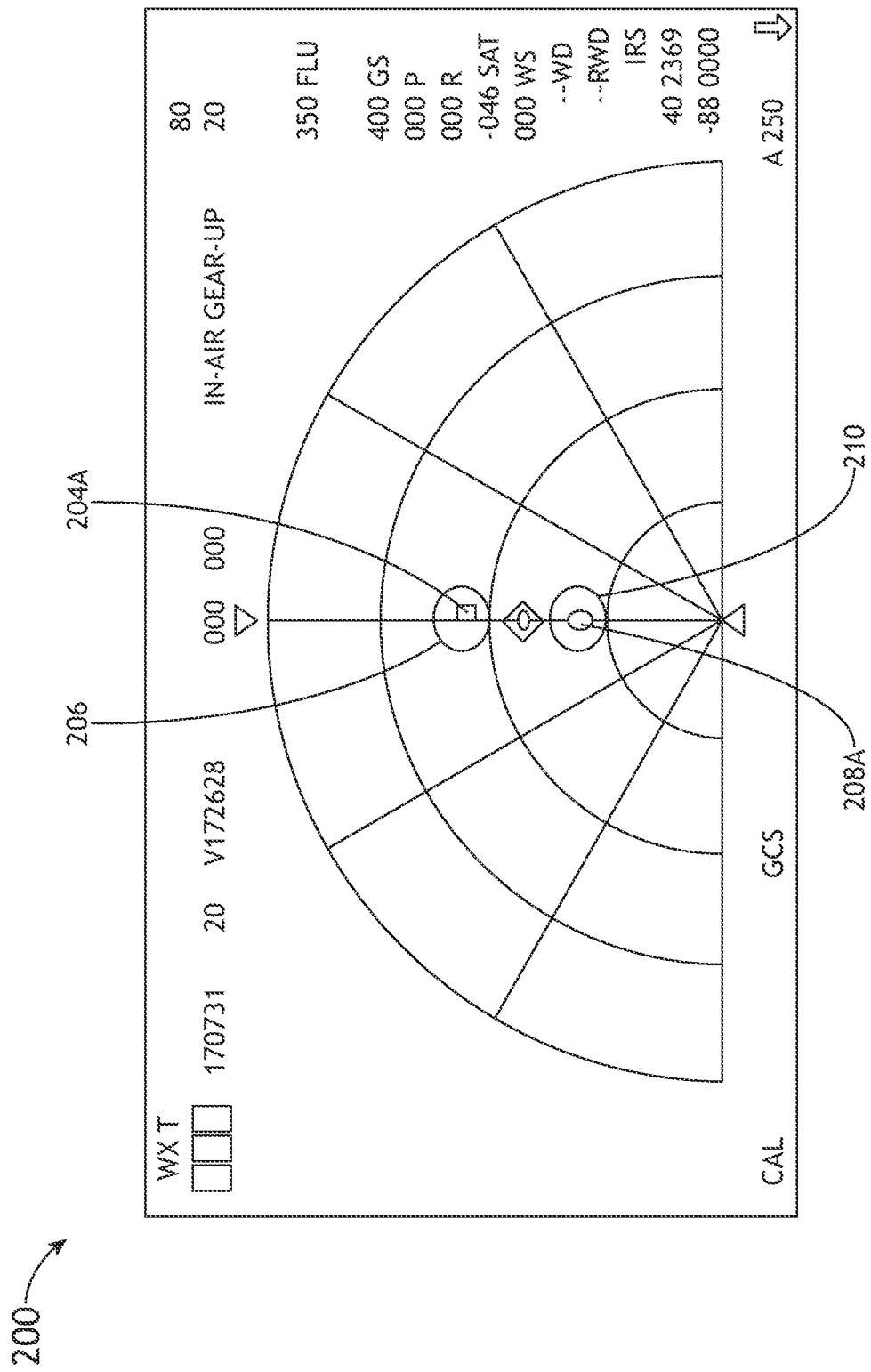
FIG. 2A shows a rendered display according to an exemplary embodiment.
Figure 2B:
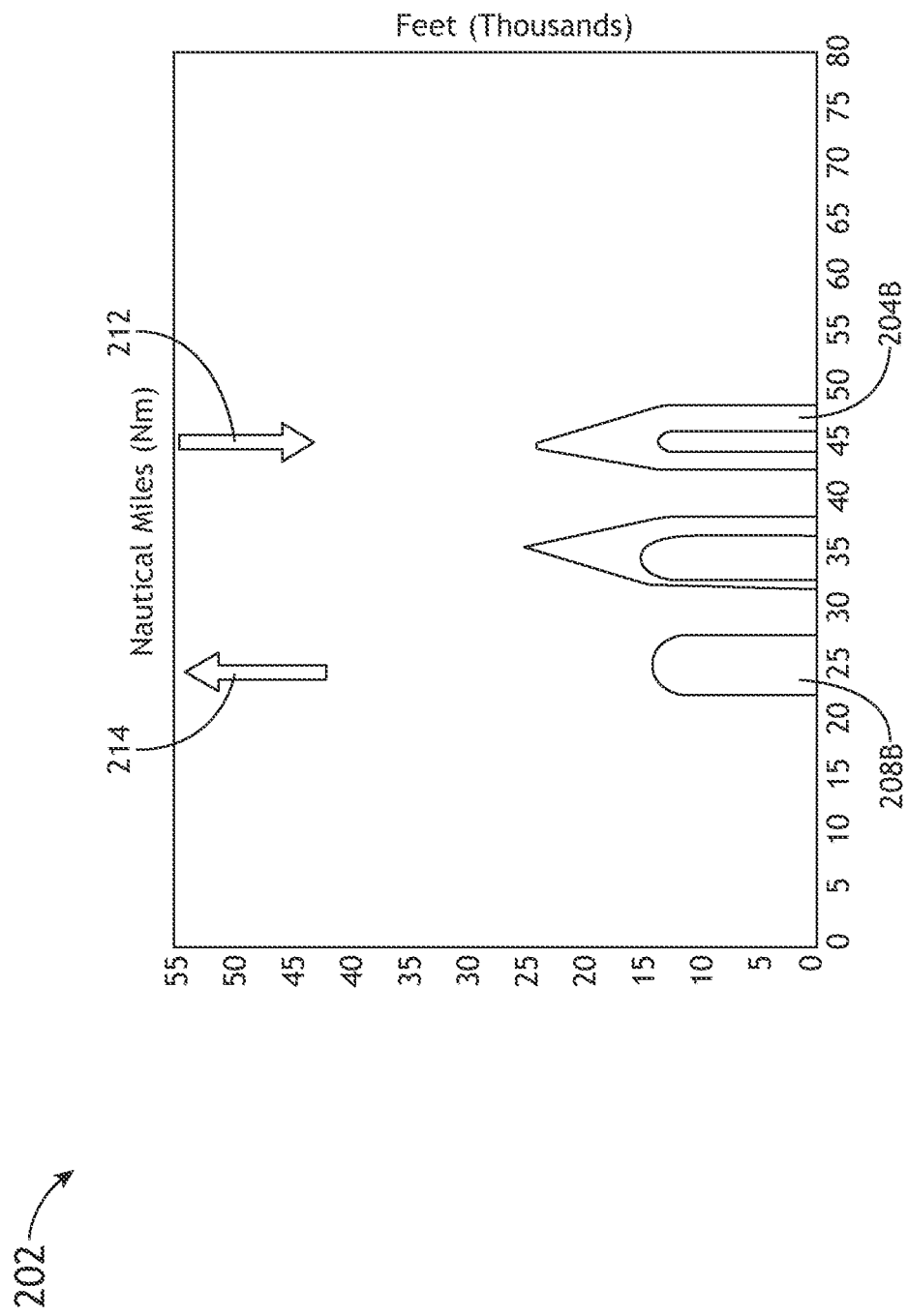
FIG. 2B shows a rendered display according to an exemplary embodiment.

Referring to FIGS. 2A-2B, rendered displays 200, 202 according to an exemplary embodiment are shown. The rendered displays 200, 202 may comprise a perspective or overhead rendering 200 and/or an elevation rendering 202. When a corresponding processor receives storm related data, storm representations 204A, 204B, 208A, 208B are rendered. The processor then receives or computes a growth rate of each storm, and artifices 206, 210, 212, 214 indicating those growth rates are rendered proximal to the corresponding storm representations 204A, 208A, 204B, 208B.

In at least one embodiment, the artifices 206, 210, 212, 214 are color coded according to a severity of the corresponding storm. Severity may be based on threshold growth rates, or threshold growth rates and a proximity to the aircraft flight path. The artifices 206, 210, 212, 214 may also be size dependent according to either a relative growth rate or an actual projected future size of the storm.

In at least one embodiment, the artifices 212, 214 may indicate changes in height to the storm; either in absolute terms, or with respect to current or projected height changes. For example, arrows may indicate the corresponding growth rate.

Figure 3A:
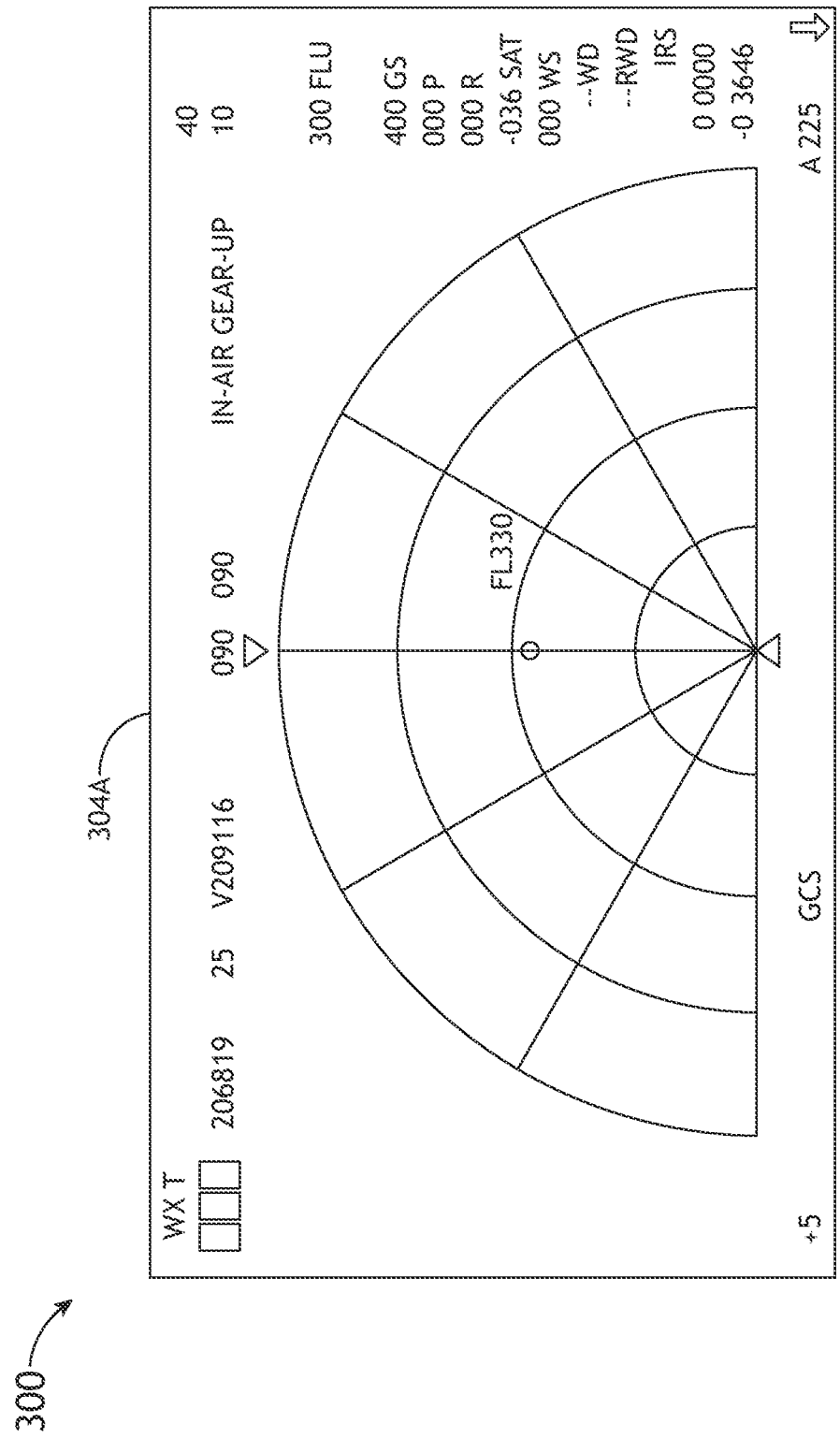
FIG. 3A shows a rendered display according to an exemplary embodiment.
Figure 3B:
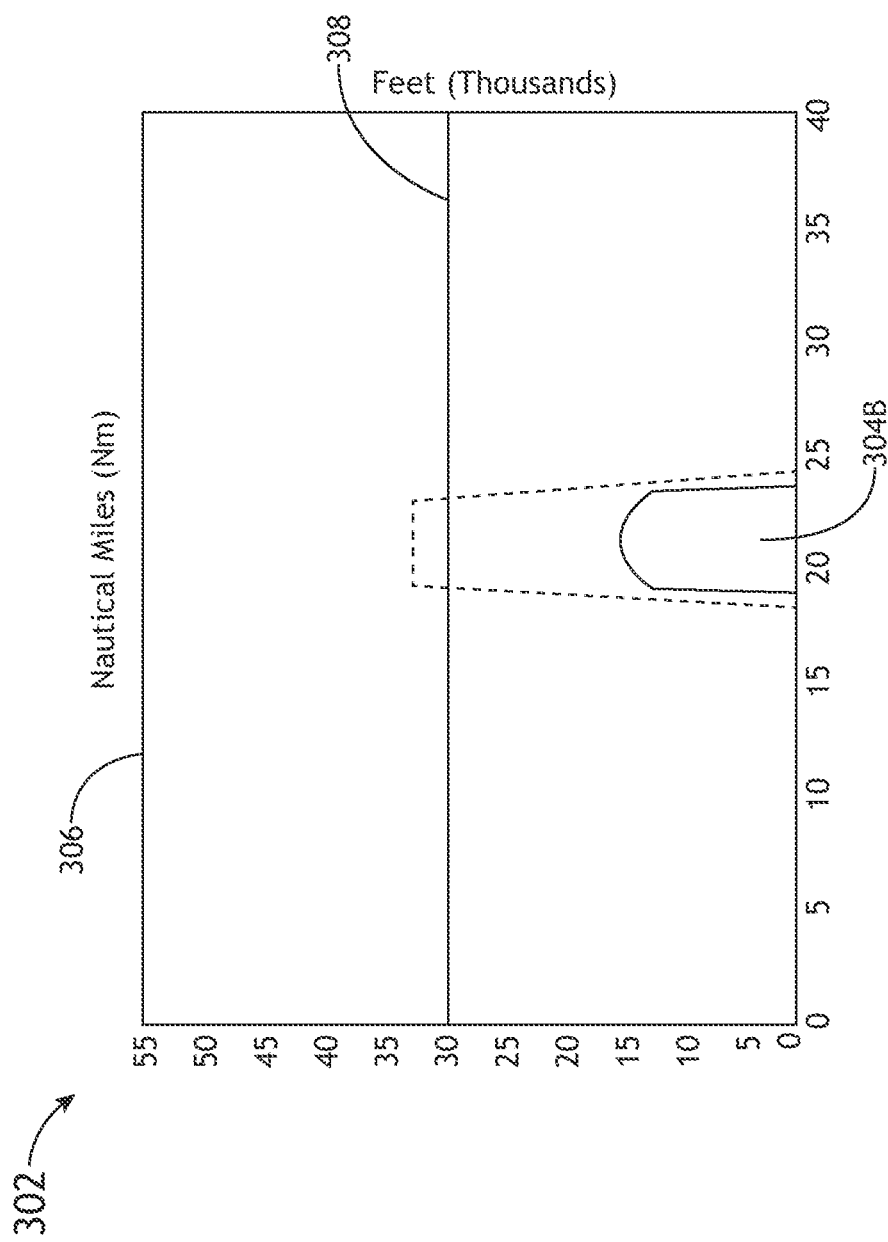
FIG. 3B shows a rendered display according to an exemplary embodiment.

Referring to FIGS. 3A-3B, rendered displays 300, 302 according to an exemplary embodiment are shown. The rendered displays 300, 302 may comprise a perspective or overhead rendering 300 and/or an elevation rendering 302. When a corresponding processor receives storm related data, storm representations 304A, 304B are rendered. The processor then receives or computes a growth rate of each storm, and receives or computes a flight path and airspeed of the aircraft. The processor projects an intersection or proximity time based on the flight path and airspeed. The processor then projects a storm size and/or height based on the intersection or proximity time and growth rate. Projected storm top altitudes may be rendered on an overhead display (as in FIG. 3A).

Artifices 306 indicating a projected height growth rate is rendered proximal to the corresponding storm representations 304B. A projected aircraft elevation 308 may also be rendered to depict a projected intersection of the aircraft and the storm at the intersection or proximity time.

In at least one embodiment, the artifices 306 are color coded according to a severity based on threshold growth rates, or threshold growth rates and a proximity to the aircraft elevation 308. The artifices 306 may also be size dependent according to either a relative growth rate or an actual projected future size of the storm.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A weather radar interface device comprising:
   at least one processor configured for data communication with a display device, and a weather radar system, and in data communication with a memory storing processor executable code for configuring the at least one processor to:
   receive storm growth rate data specific to a storm from the weather radar;
   render a representation of the storm on the display;
   render a representation of storm height on an elevation display;
   determine a storm severity based on the growth rate and predetermined threshold severities;
   render an artifice indicating the storm severity on the display, proximal to the representation of the storm; and
   render an artifice indicating a storm height growth rate in the form of an arrow proximal to each representation of storm height.

2. The weather radar interface device of claim 1, wherein the artifice comprises a color-coded ring.

3. The weather radar interface device of claim 2, wherein the artifice is rendered at a size corresponding to the growth rate.

4. The weather radar interface device of claim 1, wherein the at least one processor is further configured to determine a projected storm size at a future time based on the growth rate, a flight path, and an airspeed of the aircraft at a time when the aircraft will be proximal to the storm.

5. The weather radar interface device of claim 1, wherein:
   the at least one processor is further configured to receive flight path and airspeed data of the aircraft; and determining the storm severity is further based on the flight path and airspeed data.

6. The weather radar interface device of claim 1, wherein the at least one processor is further configured to continuously receive storm growth data and update the determined storm severity.

7. A method comprising:
iteratively receiving storm size data specific to a storm from a weather radar;
determine a growth rate of the storm based on changes in storm size data over time;
rendering a representation of the storm on a display;
rendering a representation of storm height on an elevation display;
determining a storm severity based on the growth rate and predetermined threshold severities;
rendering an artifice indicating the storm severity on the display, proximal to the representation of the storm; and
rendering an artifice indicating a storm height growth rate in the form of an arrow proximal to each representation of storm height.

8. The method of claim 7, wherein the artifice comprises a color-coded ring.

9. The method of claim 8, wherein the artifice is rendered at a size corresponding to the growth rate.

10. The method of claim 7, further comprising:
receiving flight path and airspeed data from an avionics system;
determining a projected storm size at a future time based on the growth rate, flight path, and airspeed at a time when an aircraft is proximal to the storm.

11. The method of claim 7, further comprising receiving flight path and airspeed data from the other avionics systems, wherein determining the storm severity is further based on the flight path and airspeed data.

12. The method of claim 7, further comprising continuously updating the storm growth rate and updating the determined storm severity.

13. An avionics computer system comprising:
at least one processor in data communication with a display device, a weather radar system, and a memory storing processor executable code for configuring the at least one processor to:
receive storm growth rate data specific to a storm from the weather radar;
render a representation of the storm on the display;
render a representation of storm height on an elevation display;
determine a storm severity based on the growth rate and predetermined threshold severities;
render an artifice indicating the storm severity on the display, proximal to the representation of the storm; and
render an artifice indicating a storm height growth rate in the form of an arrow proximal to each representation of storm height.

14. The avionics computer system of claim 13, wherein the artifice comprises a color-coded ring.

15. The avionics computer system of claim 14, wherein the artifice is rendered at a size corresponding to the growth rate.

16. The avionics computer system of claim 13, further comprising a datalink connection to other avionics systems, wherein the at least one processor is further configured to:
receive flight path and airspeed data from the other avionics systems;
determine a projected storm size at a future time based on the growth rate, flight path, and airspeed at a time when an aircraft is proximal to the storm.

17. The avionics computer system of claim 13, further comprising a datalink connection to other avionics systems, wherein:
the at least one processor is further configured to receive flight path and airspeed data from the other avionics systems; and
determining the storm severity is further based on the flight path and airspeed data.

18. The avionics computer system of claim 13, wherein the at least one processor is further configured to continuously receive storm growth data and update the determined storm severity.

* * * * *